US010377039B1

(12) United States Patent
Gennis et al.

(10) Patent No.: US 10,377,039 B1
(45) Date of Patent: *Aug. 13, 2019

(54) TAGGED ROBOT SENSOR DATA

(71) Applicant: X Development LLC, Mountain View, CA (US)

(72) Inventors: Jamie Moline Gennis, San Jose, CA (US); Andre Hentz, Mountain View, CA (US); Daniel Lam, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,497

(22) Filed: Sep. 19, 2018

Related U.S. Application Data

(63) Continuation of application No. 14/850,888, filed on Sep. 10, 2015, now Pat. No. 10,118,296.

(51) Int. Cl.
*H04B 10/00* (2013.01)
*B25J 9/16* (2006.01)
*H04L 12/24* (2006.01)
*H04L 29/08* (2006.01)

(52) U.S. Cl.
CPC ............. *B25J 9/1656* (2013.01); *H04L 41/08* (2013.01); *H04L 41/085* (2013.01); *H04L 41/0896* (2013.01); *H04L 67/1029* (2013.01); *Y10S 901/46* (2013.01)

(58) Field of Classification Search
CPC . H04L 41/0896; H04L 41/08; H04L 67/1029; H04L 41/085; H04L 17/00; H04L 15/00; F16H 2061/0081; H04B 10/00; H04B 1/00

USPC .......................................................... 709/223
See application file for complete search history.

(56) References Cited

U.S. PATENT DOCUMENTS

| 4,910,692 | A | 3/1990 | Outram et al. |
| 4,974,181 | A | 11/1990 | Sinderson et al. |
| 5,365,229 | A | 11/1994 | Gardner et al. |
| 7,698,401 | B2 | 4/2010 | Atluri et al. |

(Continued)

OTHER PUBLICATIONS

Tang, X., & Xu, J. (2008). Adaptive Data Collection Strategies for Lifetime-Constrained Wireless Sensor Networks. Parallel and Distributed Systems, IEEE Transactions on, 19(6), 721-734.

(Continued)

*Primary Examiner* — Mahran Y Abu Roumi
(74) *Attorney, Agent, or Firm* — Middleton Reutlinger

(57) ABSTRACT

Methods, apparatus, systems, and computer-readable media are provided for creating, storing, and/or offloading tagged robot sensor data. In various implementations, a first plurality of sensor data points that are sampled by one or more sensors associated with a robot and that share a first attribute may be identified. Each of the first plurality of sensor data points may be tagged with a first tag, which may be indicative of the first attribute. A context in which a robot is operating may be identified. A first transport rule that governs how sensor data points tagged with the first tag are treated when the robot operates in the context may then be identified. At least a subset of the first plurality of tagged sensor data points may then be offloaded from the robot and/or stored locally on the robot pursuant to the first transport rule.

18 Claims, 5 Drawing Sheets

(56) References Cited

U.S. PATENT DOCUMENTS

| | | | |
|---|---|---|---|
| 8,719,326 B2 | 5/2014 | Richard | |
| 8,810,369 B2 | 8/2014 | Ackley | |
| 2003/0187547 A1* | 10/2003 | Naka | G05D 1/0225 |
| | | | 700/245 |
| 2006/0293786 A1* | 12/2006 | Baba | B25J 5/007 |
| | | | 700/245 |
| 2010/0060434 A1* | 3/2010 | Shiotsu | G06K 19/0707 |
| | | | 340/10.51 |
| 2012/0197439 A1* | 8/2012 | Wang | B25J 9/1689 |
| | | | 700/259 |
| 2012/0265391 A1* | 10/2012 | Letsky | A01D 34/008 |
| | | | 701/25 |
| 2012/0286905 A1* | 11/2012 | Reuber | H01H 33/6662 |
| | | | 335/20 |
| 2013/0208822 A1* | 8/2013 | Zhang | H04L 5/001 |
| | | | 375/295 |
| 2013/0325244 A1* | 12/2013 | Wang | G05D 1/028 |
| | | | 701/26 |
| 2015/0235060 A1* | 8/2015 | Liao | G06K 7/10009 |
| | | | 340/10.1 |
| 2016/0236867 A1* | 8/2016 | Brazeau | B65G 1/1378 |
| 2016/0274586 A1* | 9/2016 | Stubbs | G06K 7/10366 |

OTHER PUBLICATIONS

Wang, L., Yang, Y., Noh, D. K., Le, H. K., Liu, J., Abdelzaher, T. F., & Ward, M. (Dec. 2009). AdaptSens: An Adaptive Data Collection and Storage Service for Solar-Powered Sensor Networks. In Real-Time Systems Symposium, 2009, RTSS 2009. 30th IEEE (pp. 303-312). IEEE.

* cited by examiner

TAGGED ROBOT SENSOR DATA

The present application is a continuation of U.S. patent application Ser. No. 14/850,888, which was filed on Sep. 10, 2015 and issued as U.S. Pat. No. 10,118,296 on Nov. 6, 2018, and which is incorporated herein by reference.

BACKGROUND

Sensor data produced by a robot can be used for a variety of purposes, such as debugging the robot, gathering various statistics about how the robot operates, learning about an environment in which the robot operates, etc. However, robots typically have numerous sensors that produce a large amount of sensor data. For example, many robots have multiple operational components (e.g., joints, gears, drives, etc.), many of which include or act as sensors (e.g., torque sensors) that collect data points pertaining to the operational components. Many robots also include various standalone sensors, such as microphones, cameras, accelerometers, GPS sensors, proximity sensors, and so forth, each producing yet more sensor data. Depending on the robot's context, storing such large amounts of sensor data locally in memory of a robot may not be practicable. It may be feasible to offload the sensor data to a remote computing system such as a logging server or debugging workstation under some circumstances, such as when available communication bandwidth/reliability between the robot and the remote computing system is relatively high. However, robots, and particularly autonomous or semi-autonomous robots, often operate in contexts in which communication is limited.

SUMMARY

The present disclosure is generally directed to methods, apparatus, and computer-readable media (transitory and non-transitory) for creating, offloading, and/or storing tagged robot sensor data. Data points sampled by robot sensors may be "tagged" based on attributes of the data points, such as origin and/or data type. Then, tagged sensor data points may be automatically stored in memory of the robot and/or offloaded to a remote computing system pursuant to one or more so-called "transport rules" that govern how tagged sensor data is offloaded and/or stored while the robot operates in various contexts. For example, if a robot is being debugged and therefore has a high reliability, high bandwidth communication channel with a debugging workstation, all or most tagged sensor data points may be offloaded to the workstation. However, if the robot is deployed in the field with only a weak wireless network connection, then all or a subset of sensor data tagged as relatively high priority may be offloaded to a remote computing system, and sensor data tagged as relatively low priority may not be offloaded and/or instead may be stored locally.

In some implementations, a method may be provided that includes: identifying, by a robot, a first plurality of sensor data points that are sampled by one or more sensors associated with the robot and that share a first attribute; tagging, by the robot, each of the first plurality of sensor data points with a first tag, wherein the first tag is indicative of the first attribute shared by the first plurality of sensor data points; identifying, by the robot, a context in which the robot is operating; identifying, by the robot, a first transport rule that governs how sensor data points tagged with the first tag are treated when the robot operates in the context; and offloading or storing, by the robot, at least a subset of the first plurality of tagged sensor data points pursuant to the first transport rule.

This method and other implementations of technology disclosed herein may each optionally include one or more of the following features.

In various implementations, the offloading may include transmitting at least the subset of the first plurality of tagged sensor data points to a remote computing device in a manner selected based on the context in which the robot is operating. In various implementations, the subset may be selected from the first plurality of sensor data points based on the context in which the robot is operating. In various implementations, the transmitting may include transmitting at least the subset of the first plurality of tagged sensor data points through one or more communication channels selected based on the context.

In various implementations, the context may include available communication bandwidth between the robot and the remote computing device. In various implementations, the context may include reliability of a communication channel between the robot and the remote computing device. In various implementations, the context may include power available to the robot. In various implementations, the context may include available memory in the robot. In various implementations, the context may include an activity level of the robot.

In various implementations, the first attribute may include an origin of the first plurality of sensor data points. In various implementations, the first attribute may include a data type of the first plurality of sensor data points. In various implementations, the method may further include: identifying, by the robot, a second plurality of sensor data points that are sampled by the one or more sensors associated with the robot and that share a second attribute; tagging, by the robot, each of the second plurality of sensor data points with a second tag, wherein the second tag is different than the first tag and is indicative of the second attribute shared by the second plurality of sensor data points; identifying, by the robot, a second transport rule that governs how data points tagged with the second tag are treated when the robot operates in the context; and offloading or storing, by the robot, at least a subset of the second plurality of tagged sensor data points pursuant to the second transport rule.

Other implementations may include a non-transitory computer readable storage medium storing instructions executable by a processor to perform a method such as one or more of the methods described above. Yet another implementation may include a system, such as a robot, that includes memory and logic operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
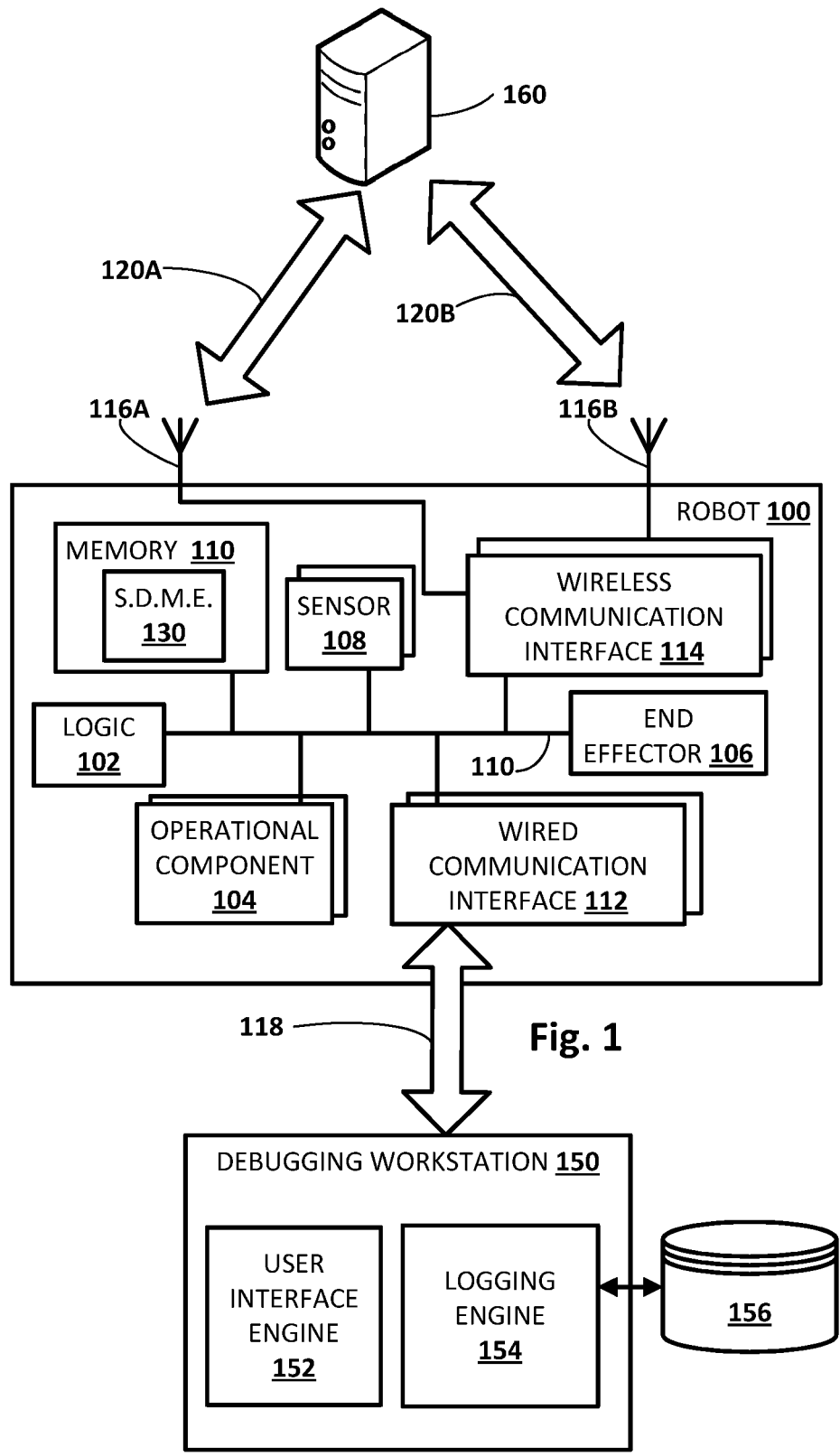
FIG. 1 schematically depicts an example environment in which disclosed techniques may be implemented, in accordance with various implementations.

FIG. 1 schematically depicts an example environment in which disclosed techniques may be implemented to, in accordance with various implementations. A robot 100 may take various forms, including but not limited to a telepresence robot, a robot arm, a humanoid, an animal, an insect, an aquatic creature, a wheeled device, a submersible vehicle, an unmanned aerial vehicle ("UAV"), and so forth. Robot 100 may include logic 102 operably coupled to one or more operational components 104, one or more end effectors 106, one or more standalone sensors 108, memory 110, one or more wired communication interfaces 112, and one or more wireless communication interfaces 114 via one or more internal buses 110. Logic 102 may, in various implementations, include one or more processors, such as one or more so-called "real time processors" that are guaranteed to perform various operations within various temporal constraints.

As used herein, "operational components" 104 of robot 100 may refer to actuators, motors (e.g., servo motors), joints, shafts, gear trains, wheels, tracks, pumps (e.g., air or liquid), pistons, drives, or other components that may create and/or undergo propulsion, rotation, and/or motion to move components of robot 100 relative to each other, and/or to move robot 100 as a whole. Some operational components may be independently controllable, although this is not required. In some instances, the more operational components robot 100 has, the more degrees of freedom of movement it may have. As noted in the background, many operational components 104 include and/or are coupled with sensors configured to provide raw data associated with operation of the operational component 104. For example, a joint may include a torque sensor.

As used herein, "end effector" 106 may refer to a variety of tools that may be operated by robot 100 in order to accomplish various tasks. For example, some robots may be equipped with various types of "grippers," including but not limited to "impactive" (e.g., "grab" objects using opposing digits), "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth.

Standalone sensors 108 may take various forms, including but not limited to cameras, light sensors (e.g., passive infrared), pressure sensors, pressure wave sensors (e.g., microphones), proximity sensors, torque sensors, force sensors, radars, range finders, accelerometers, gyroscopes, compasses, position coordinate sensors (e.g., global positioning system, or "GPS"), speedometers, drop off sensors (e.g., to detect an edge of a raised surface), and so forth. While standalone sensors 108 are depicted as being integral with robot 100, this is not meant to be limiting. In some implementations, standalone sensors 108 may be located external to, but may be in direct or indirect communication with, robot 100. The term "sensor" as used herein without any modifiers (e.g., "standalone") may refer to both operational components 104 and standalone sensors 108.

Memory 110 may come in various forms, including but not limited to random access memory ("RAM"), read only memory ("ROM"), dynamic RAM ("DRAM"), flash, etc. In various implementations, logic 102 may execute one or more instructions contained in memory 110 to operate a sensor data management engine ("S.D.M.E." in FIG. 1) 130. Sensor data management engine 130 will be described in more detail with regard to FIG. 2.

Wired communication interface(s) 112 may come in various forms, including but not limited to Ethernet, USB, serial, PCIe external, etc. Wired communication interface 112 may be used to exchange data with one or more remote computing systems through one or more wired communication channels 118. Similarly, wireless communication interface (s) 114 may come in various forms that utilize various wireless communication technologies, including but not limited to Wi-Fi, Bluetooth, cellular (e.g., 3G, 4G LTE, etc.), radio, and so forth. Wireless communication interface 114 may be operably coupled with one or more antenna 116, of which two examples, 116A and 116B, are depicted in FIG. 1. Each antenna 116 may be configured to transmit data provided (e.g., modulated) by wireless communication interface 114 over one or more wireless communication channels 120A-B. As one non-limiting example, first antenna 116A could be a Wi-Fi antenna, and second antenna 116B could be a Bluetooth antenna. While not required, it is often the case that wired communication channels such as 118 are more reliable and/or have more bandwidth than wireless communication channels such as 120A-B.

Robot 100 may be in communication with various remote computing systems for various purposes, such as controlling robot 100 to various degrees, debugging robot 100, and so forth. For example, robot 100 may, in some contexts such as when the robot is being programmed and/or debugged, be in communication with a debugging workstation 150 over wired communication channel 118. Debugging workstation 150 may include one or computing systems connected by one or more networks (not depicted). An example of such a computing system is depicted schematically in FIG. 5. Various modules or engines may be implemented as part of debugging workstation 150 as software, hardware, or any combination of the two. For example, in FIG. 1, debugging workstation 150 includes a user interface engine 152 and a logging engine 154.

User interface engine 152 may be configured to receive, as input, commands from various sources, such as human technicians. In some implementations, user interface engine 152 may provide one or more user interfaces, locally and/or distributed to remote computing devices (e.g., as interactive web pages), which may be operated by users such as technicians to perform various tasks, such as programming and/or debugging robot 100. In some implementations, user interface engine 152 may provide an interface that is operable by a user to select how various types of sensor data sampled by standalone sensors 108 and/or operational components 104 of robot 100 should be tagged. For example, a user may operate the interface to cause robot 100 to tag sensor data sampled by one sensor with a first tag, and sensor data sampled by another sensor with a second tag (origin-based tagging). Additionally or alternatively, the user may operate the interface to configure robot 100 to tag sensor data sampled while robot 100 operates in a first context (e.g., normal operation) with a first tag, to tag sensor data sampled while robot 100 operates in a second context (e.g., recalibration mode) with a second tag, to tag sensor data sample while robot 100 operates in a third context (e.g., error and/or collision response mode) with a third tag, and so on.

User interface engine 152 may provide the same or different graphical user interface (see FIG. 3) that is operable to configure how robot 100 affirmatively offloads (e.g., pushes) tagged sensor data to a remote computing device (e.g., 150, 160), and/or how tagged sensor data is retrieved (e.g., pulled) from robot 100. For example, a user may wish to only see a particular type of sensor data (i.e. tagged with a particular data type tag) and/or sensor data sampled by a particular sensor (i.e. tagged with particular origin tag), such as data sampled by a particular joint while robot 100 is in an error response mode. The user may, in effect, define a transport rule "on the fly" that causes the robot to offload only sensor data tagged with the targeted data type tag and targeted origin tag. As this example makes clear, in some implementations, sensor data points may be tagged with multiple tags.

Logging engine 154 may be configured to receive, e.g., from robot 100, sensor data that robot 100 offloads pursuant to one or more transport rules. Logging engine 154 may store such sensor data in an index 156. In many scenarios, records of sensor data in index 156 may be provided by logging engine 154 for use in debugging robot 100. For example, a user operating an interface (see FIG. 3) provided by user interface engine 152 may request a particular type of sensor data, or sensor data sampled by a particular operational component 104 or standalone sensor 108 of robot 100, so that the user can perform debugging analysis.

One or more remote computing systems 160 may be in communication with robot over different communication channels, such as wireless communication channels 120A and/or 120B. Remote computing system 160 may come in various forms and may be used for various purposes pertaining to operation of robot 100. For example, remote computing system 160 could simply be a debugging workstation with components similar to those of debugging workstation 150, except that remote computing system 160 is only in communication with robot 100 over wireless channels 120A and/or 120B, rather than wired communication channel 118. As another example, remote computing system 160 could be a computing device operating a software application that may be used to exert various degrees of control over robot 100, e.g., a program operable to "check out" robot 100. The more autonomy robot 100 has, the less control such an application may exert over robot.

Figure 2:
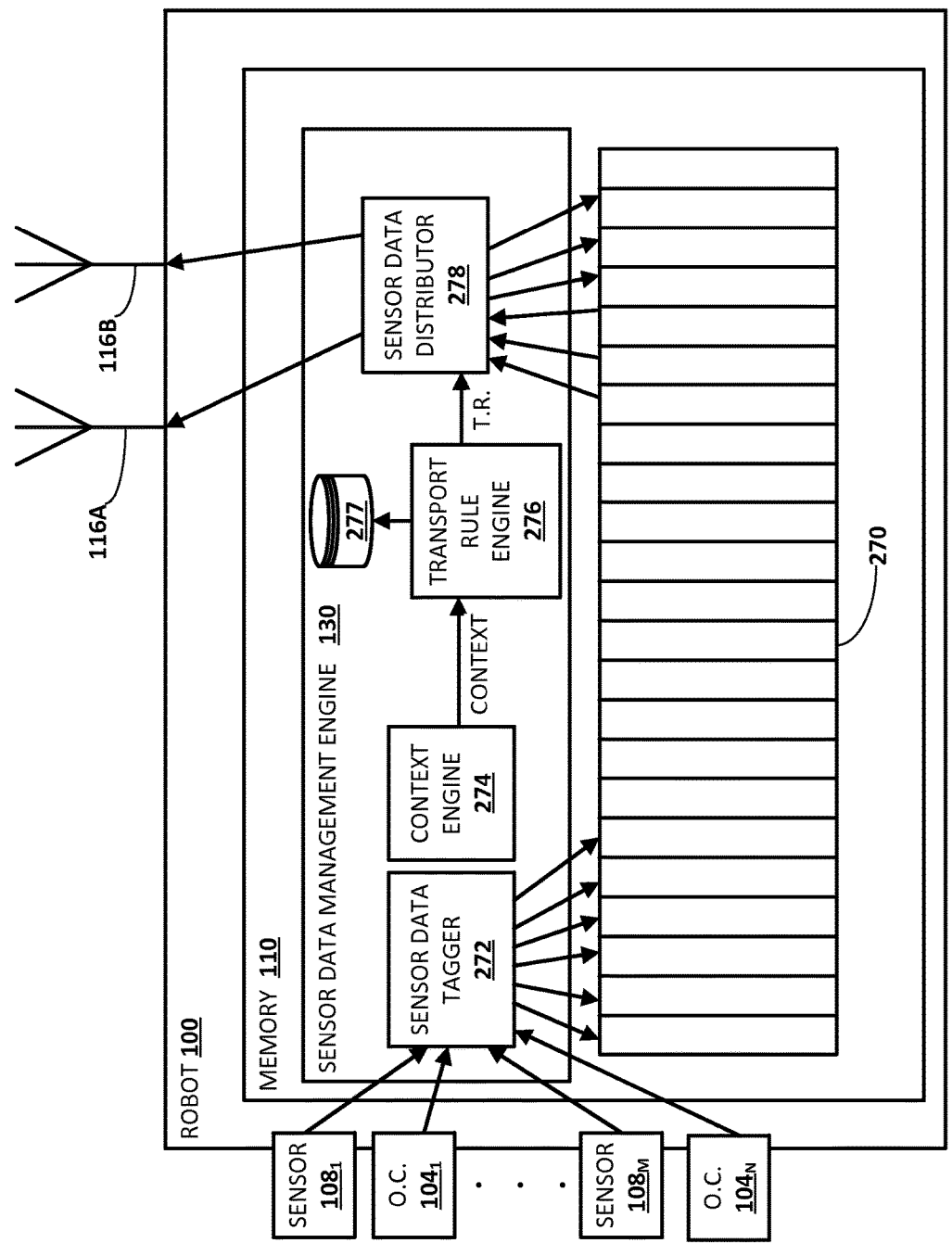
FIG. 2 schematically depicts in more detail than FIG. 1 example components of a robot that may cooperatively tag sensor data and distribute it pursuant to one or more transport rules, in accordance with various implementations.

FIG. 2 schematically depicts in more detail than FIG. 1 an example of how robot 100 may offload and/or store sensor data pursuant to one or more transport rules, in accordance with various implementations. Robot 100 operates, e.g., in memory 110, an instance of a sensor data management engine 130. Sensor data management engine 130 may be configured to obtain sensor data sensed by one or more sensors, such as standalone sensors 108 and/or sensors associated with operational components 104, tag that data for storage in one or more buffers 270 of memory 110 (e.g., a ring buffer), and treat that data pursuant to one or more transport rules, e.g., by offloading at least a subset of the sensor data through one or more communication channels (e.g., 118, 120A-B), by selectively storing a subset of the sensor data, and/or by disregarding some of the sensor data.

In this example, sensor data management engine 130 includes a sensor data tagger 272, a context engine 274, a transport rule engine 276, and a sensor data distributor 278.

Sensor data tagger 272 may be configured to identify various groups of sensor data points that are sampled by one or more sensors 108/104 associated with robot 100 and that share an attribute, and to tag the identified data points with a tag that is indicative of the attribute shared by the data points. How sensor data tagger 272 tags sampled sensor data points may be determined in various ways. In some implementations, a user may configure robot 100, e.g., directly and/or through a user interface (e.g., provided by user interface engine 152), to tag particular sensor data in various ways. In some implementations, robot 100 may be manufactured with a default sensor data point tagging scheme that, for instance, tags each sensor data point with a tag indicative of its origin.

In various implementations, attributes that may be used as bases for tagging sensor data points may come in various forms, such as an origin of a sensor data point (which sensor/operational component sampled it?), a data type of a data point (e.g., float, double, torque measurement, temperature, etc.), and/or a context in which the data point was sampled (e.g., during normal operation, debugging, error response mode, robot calibration, etc.). In some implementations, a sensor data point may be tagged with a single tag. In some implementations, a sensor data point may be tagged with multiple data tags. To "tag" a sensor data point may mean to store, e.g., in a memory location of buffer 270 that is associable with another memory location of buffer 270 that stores or will store the sensor data point itself, data that is indicative of the attribute shared by the sensor data point with other sensor data points. For example, in some implementations, a sensor data point and its associated tag(s) may be stored in contiguous memory locations of buffer 270. In other implementations, a sensor data point may be stored with a pointer that points to another memory location storing a tag associated with the sensor data point.

As noted in the background, no matter how much storage capacity memory 110 has, sensors such as standalone sensors 108 and/or operational components 104 may produce so much data that memory 110 can easily become full. And in some instances, all or a portion of memory 110 may be implemented as a ring or circular buffer that is treated as though it is connected end-to-end, such that data written to the ring buffer is periodically overwritten as a matter of course. Accordingly, various other components of sensor data management engine 130 may be configured to treat tagged sensor data points in various ways (e.g., offloading, storing, disregarding/overwriting) so that important sensor data is less likely to be overwritten.

Context engine 274 may be configured to determine, at any given point in time, a context in which robot 100 operates. The term "context" as used herein may refer to the circumstances in which robot 100 operates, such as particular communication channels available or not available to robot 100, an activity level of robot 100, an amount of charge available to robot 100 (e.g., how much power is left in its battery), an amount of memory available within robot 100, and so forth. Context engine 274 may provide data indicative of a current context of robot 100 to transport rule engine 276.

Transport rule engine 276 may be configured to identify one or more transport rules stored in an index 277. As noted above, a transport rule may govern how data points tagged with a particular tag are treated when robot 100 operates in a particular context. In some implementations, each possible context of the robot may be associated with a plurality of transport rules, and each transport rule may define how data tagged with a particular tag should be treated when the robot operates in that context. In other implementations, each sensor data tag may be associated with a plurality of transport rules, and each transport rule may define how data tagged with the sensor data tag should be treated in a particular context. In various implementations, index 277 may include a lookup table or similar mechanism that may be consulted, e.g., by transport rule engine 276, to determine which transport rules are applicable to sensor data tagged with a particular tag or tags. Transport rule engine 276 may provide transport rules it identifies to sensor data distributor 278.

Sensor data distributor 278 may be configured to selectively offload or store at least a subset of various groups of commonly-tagged sensor data points pursuant to one or more transport rules received from transport rule engine 276 points while robot 100 operates in the context identified by context engine 274. For example, in FIG. 2, sensor data distributor 278 may provide all or a subset of sensor data points tagged with a first tag to first antenna 116A, all or a subset of sensor data points tagged with a second tag to second antenna 116B, and may selectively store all or a subset of sensor data points tagged with a third tag in buffer 270. In some implementations, sensor data points stored in buffer 270 by sensor data distributor 278 may be stored there temporarily (and in some instances may be locked to prevent overwriting) until robot 100 has a communication channel available that is more suitable to offload this sensor data.

Transport rules may govern how tagged data is offloaded from robot 100 or stored in innumerable ways. For example, one transport rule may provide that highly critical sensor data tagged with a first tag is offloaded via a first, relatively high bandwidth channel (e.g., Wi-Fi). The transport rule may likewise provide that less critical sensor data tagged with a second tag is offloaded via another channel (e.g., Bluetooth). In some instances, sensor data tagged with a particular tag may be offloaded in an amount and/or manner that is commensurate with a reliability or available communication bandwidth of a channel. For example, if a high bandwidth, high reliability channel is available, a transport rule may provide that all sensor data tagged with a particular tag may be offloaded through the channel. However, if a lower bandwidth, lower reliability channel is all that is available, the same transport rule or a different transport rule may provide that a compressed subset of the tagged sensor data is offloaded, or that only every xth sample is offloaded, or that a compressed subset is stored in buffer 270 of robot 100 until a scheduled rendezvous between robot 100 and a charging station (during which robot 100 may have a high bandwidth data connection with a remote computing device), etc. These are just a few examples.

Figure 3:
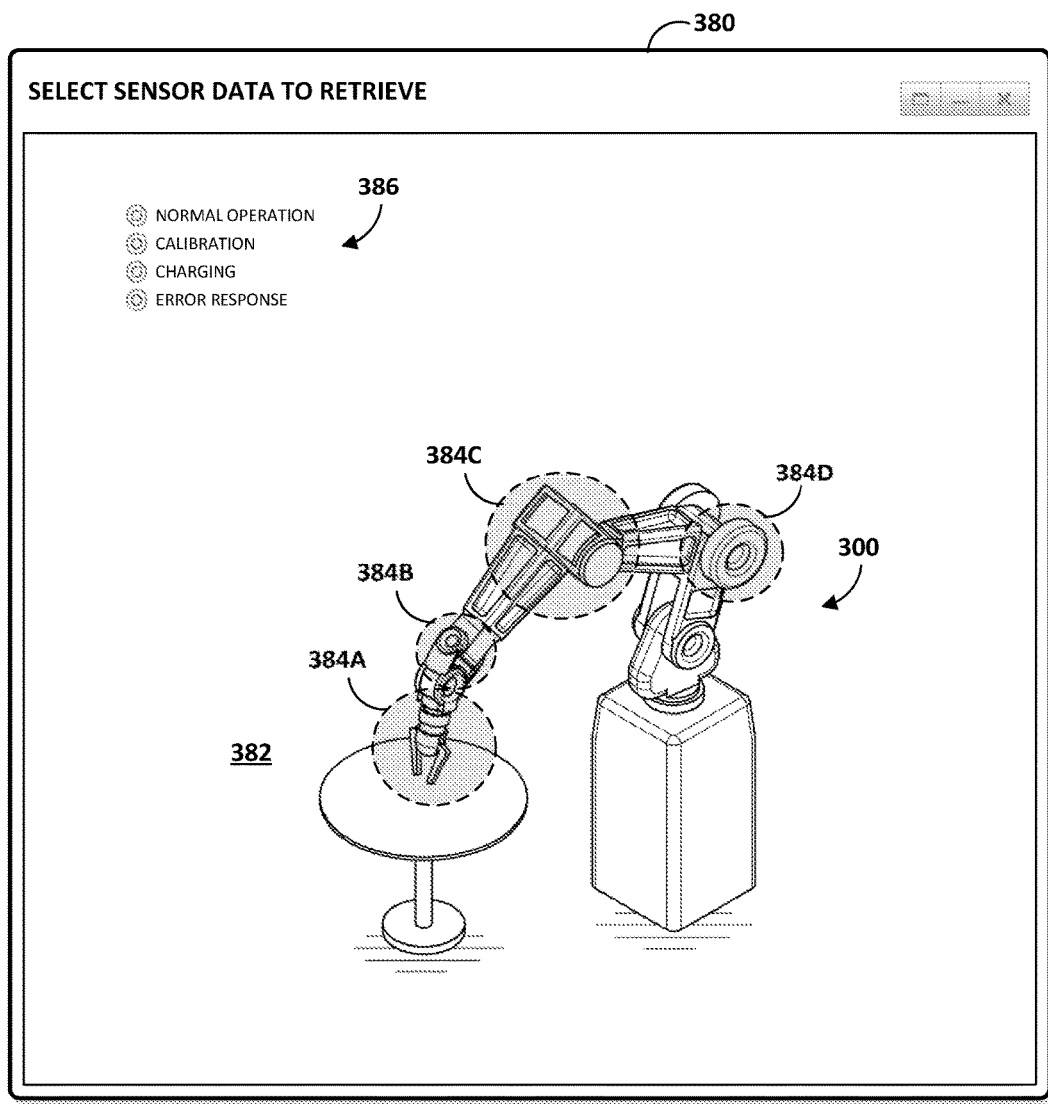
FIG. 3 depicts an example graphical user interface that may be operable to select and/or retrieve sensor data tagged with various tags, in accordance with various implementations.

FIG. 3 depicts an example "SELECT SENSOR DATA TO RETRIEVE" graphical user interface 380 that may be provided, e.g., by user interface engine 152 of debugging workstation 150, in accordance with various implementations. A robot 300 is rendered (in this example, robot 300 takes the form of a robot arm) in a multidimensional representation 382 of a robot environment. Four sensor data sources 384-D are visually emphasized. First sensor data source 384A is an end effector of the robot arm; the remaining sensor data sources 384B-D are from operational components in the form of joints. In some implementations, sensor sources may be automatically visually emphasized, e.g., by user interface engine 152, based on different tags used to tag sensor data. In this example, there appear to have been four different tags used to tag sensor data produced by robot 300, and so there are four selectable sensor sources 384. However, if more or less different types of tags are used to tag sensor data, then more or less respective selectable sensor sources 384 may be rendered.

A user may select one or more sensor data sources 384, e.g., with a mouse or on a touch screen with the user's finger, to toggle between states in which all, various subsets of, or no sensor data produced by these sources is provided, e.g., to debugging workstation 150 for storage by logging engine 154 in index 156. Additional user interface elements 386 may be provided that enable a user to select contexts in which robot 300 can operate, including normal operation, calibration, charging, and error response and to configure how sensor data is offloaded/stored in those contexts. For instance, by selecting one or more of these graphical elements 386, a user can toggle whether she wishes to receive or not receive sensor data while robot 300 operates corresponding contexts.

Figure 4:
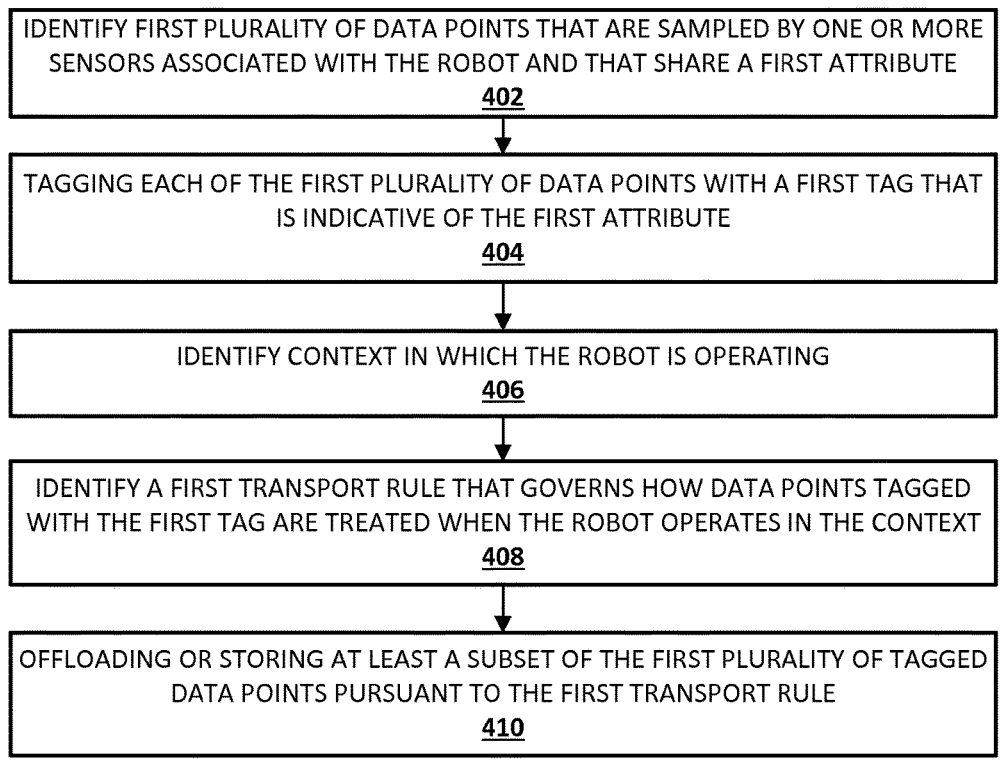
FIG. 4 depicts an example method for tagging and/or offloading/storing tagged sensor data, in accordance with various implementations.

Referring now to FIG. 4, an example method 400 of tagging sensor data and treating tagged sensor data pursuant to transport rules is depicted. For convenience, the operations of flow charts are described with reference to a system that performs the operations. This system may include various components of various computer systems, including elements of robot 100 and/or debugging workstation 150. Moreover, while operations of method 400 are shown in a particular order, this is not meant to be limiting. One or more operations may be reordered, omitted, or added. At block 402, the system may identify a first plurality of sensor data points that are sampled by one or more sensors associated with a robot and that share a first attribute. For example, sensor data tagger 272 of robot 100 may identify data points that were sampled by a torque sensor associated with a particular operational component 104.

At block 404, the system may tag each of the sensor data points identified at block 402 with a first tag that is indicative of the first attribute. For example, if each memory location that is to store an identified sensor data point will have sufficient bits to spare, the system may store a tag in the spare bits. If each memory location will not have sufficient bits to spare, then an adjacent memory location, or a memory location that is readily identified and accessible, may be used instead to store the tag. Sensor data may be tagged in various ways that may be selected by a user (e.g., a robot technician) and/or may occur automatically. For example, some sensors, such as thermometers, may be sampled at a relatively high frequency to produce a lot of raw data, but in many scenarios, only a subset of data points produced by such a sensor may be of interest. Accordingly, a user may cause such data points to be tagged and then assign transport rules to the tag that ensure that only a subset of the raw data is ever offloaded or stored, no matter what the context. Should the user later wish to see all of the raw data, the user may, for instance, operate debugging workstation to cause all sensor data tagged with that tag to be offloaded from robot 100.

At block 406, the system may, e.g., by way of context engine 274, identify a context in which robot 100 is operating. For example, robot 100 (and in particular, logic 102) may scan one or more wired communication interfaces 112 and/or one or more wireless communication interfaces 114 to determine what communication channels are currently available to robot 100. Additionally or alternatively, logic 102 may determine how much storage remains in memory 110, e.g., in buffer 270. In some implementations, logic 102 may be more prone to attempt to offload sensor data if storage is low.

Additionally or alternatively, logic 102 may, as part of identifying a context of robot 100, determine an activity level of robot 100. If robot 100 is very active, e.g., moving quickly around an environment such that strength and/or reliability of one or more wireless communication channels available to robot 100 is likely to fluctuate, then robot 100 may be more prone to cache sensor data locally, at least until robot 100 is less active (e.g., when robot 100 visits a charging station). Additionally or alternatively, logic 102 may determine how much charge remains in a battery (not depicted) of robot 100. If robot 100 is low on charge, and especially if robot will be visiting a charging station soon where it will have stronger communication channels available to it, robot 100 may be less prone to offload sensor data.

At block 408, the system may identify a first transport rule that governs how data points tagged with the first tag are treated when the robot operates in the context identified at block 406. In some implementations, multiple contextual signals may be considered and/or weighed by logic 102 when identifying, selecting, and/or applying transport rules, e.g., to select the "best" transport rule and/or to resolve conflicts. Suppose Transport Rule A is applicable in contexts in which robot 100 is low on power, and provides that robot 100 should store sensor data tagged "XYZ" locally until robot 100 returns to a charging station. Suppose further that Transport Rule B is applicable in situations in which robot 100 has little to no storage capacity remaining in memory 110, and provides that robot 100 should be more aggressive than usual to offload sensor data tagged "XYZ" to avoid the sensor data being overwritten (e.g., in a ring buffer). Now, suppose robot 100 is operating with low power, but that it also is low on storage in memory 110. While both Transport Rules A and B are applicable, they are also in conflict.

Various techniques may be employed to resolve such conflicts. For example, in some implementations, Transport Rule A would have a higher "priority" than Transport Rule B, e.g., because an operator would rather lose sensor data than have robot 100 run out of power before it reaches a charging station. In some implementations, other contextual signals and/or transport rules may be considered to break the tie. Suppose that, in the scenario described above, robot 100 currently has a wireless communication channel available to it that is relatively low bandwidth, but has at least acceptable reliability. A third transport rule, e.g., Transport Rule C, may provide that logic 102 of robot 100 cull and/or otherwise compress sensor data tagged "XYZ" for offloading over such a wireless channel when robot 100 is low on power and/or available memory. That way, at least some of the sensor data tagged "XYZ" is preserved, and robot 100 may be prevented from losing power before it can reach a charging station.

Referring back to FIG. 4, at block 410, the system may offload or store at least a subset of the first plurality of tagged sensor data points pursuant to the one or more transport rules identified at block 408. As noted above, in some implementations, logic 102 may select a subset of the tagged sensor data, e.g., by compressing the raw data, subsampling the data (e.g., selecting every xth data point), and so forth, and may only offload and/or store that subset of data. In contexts in which communication channels available to robot 100 are limited (but still available to at least some extent), this may constrain the amount of data robot 100 attempts to offload. In contexts in which communication channels are not available or insufficient, this may enable robot 100 to store at least some tagged sensor data locally without taking up an inordinate amount of memory.

Figure 5:
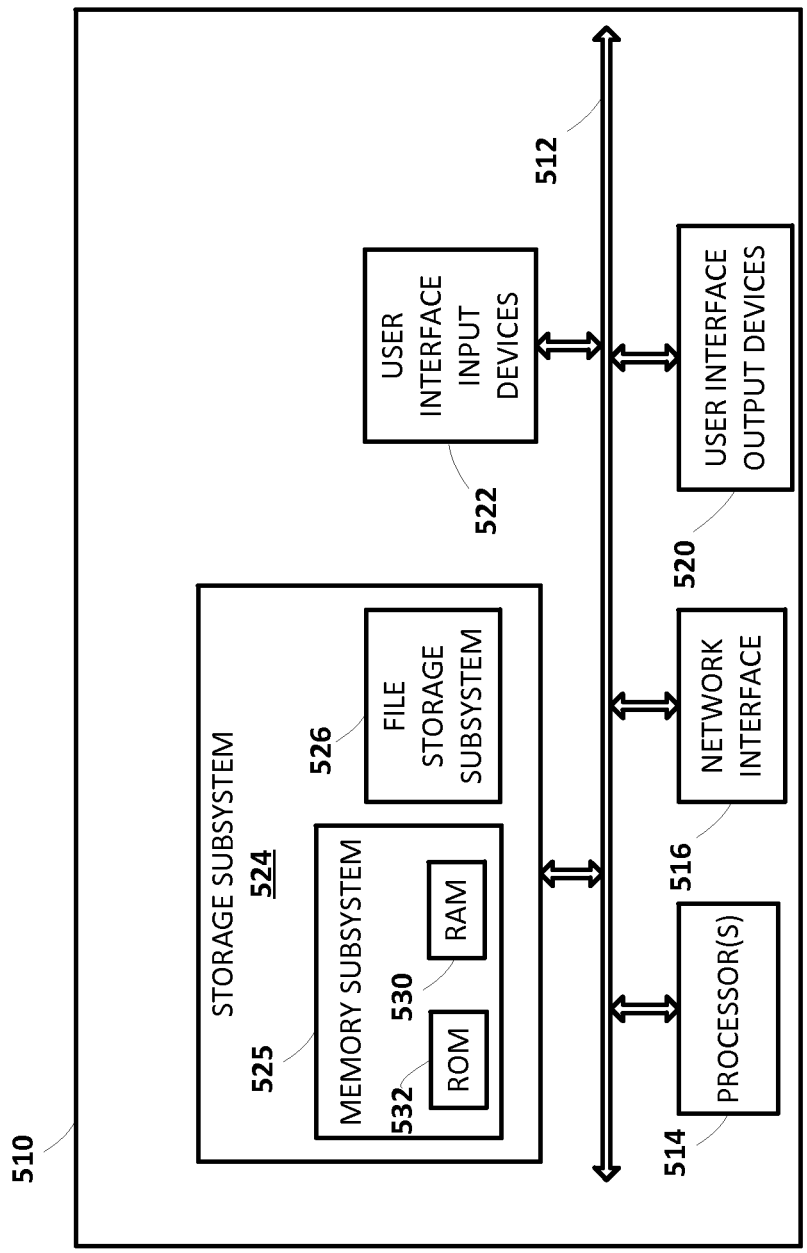
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 410. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more aspects of robot 100 and/or debugging workstation 150. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
   identifying, by a robot, first and second pluralities of sensor data points that are generated during operation of the robot while the robot performs one or more tasks, wherein the first plurality of sensor data points share a first attribute and the second plurality of sensor data points share a second attribute that is different than the first attribute, and wherein the sensor data points are generated by one or more cameras integral with the robot or one or more light sensors integral with the robot;
   tagging, by the robot, each of the identified first plurality of sensor data points with a first tag, wherein the first tag is indicative of the first attribute shared by the first plurality of sensor data points;
   tagging, by the robot, each of the identified second plurality of sensor data points with a second tag, wherein the second tag is indicative of the second attribute shared by the second plurality of sensor data points, and wherein the second tag also indicates a lower priority than the first tag;
   identifying, by the robot, a context in which the robot is operating;
   identifying, by the robot, a first transport rule that governs how sensor data points tagged with the first tag are treated when the robot operates in the context;
   identifying, by the robot, a second transport rule that governs how sensor data points tagged with the second tag are treated when the robot operates in the context;
   offloading, by the robot to a remote computing device via a network connection, at least a subset of the first plurality of tagged sensor data points pursuant to the first transport rule, wherein the offloading comprises transmitting at least the subset of the first plurality of tagged sensor data points to the remote computing device in a manner selected based on the context in which the robot is operating; and
   overwriting, by the robot, at least a subset of the second plurality of tagged sensor data points pursuant to the second transport rule.

2. The method of claim 1, wherein the subset is selected from the first plurality of tagged sensor data points based on the context in which the robot is operating.

3. The method of claim 1, wherein the network connection is selected based on the context.

4. The method of claim 1, wherein the context comprises available communication bandwidth between the robot and the remote computing device.

5. The method of claim 1, wherein the context comprises reliability of the network connection.

6. The method of claim 1, wherein the context comprises power available to the robot.

7. The method of claim 1, wherein the context comprises available memory in the robot.

8. The method of claim 1, wherein the context comprises an activity level of the robot.

9. The method of claim 1, wherein the one or more vision sensors include a proximity sensor.

10. A method comprising:
    identifying, by a robot, first and second pluralities of sensor data points that are generated during operation of the robot while the robot performs one or more tasks, wherein the first plurality of sensor data points share a first attribute and the second plurality of sensor data points share a second attribute that is different than the first attribute, and wherein the sensor data points are generated by one or more cameras integral with the robot or one or more pressure wave sensors integral with the robot;
    tagging, by the robot, each of the identified first plurality of sensor data points with a first tag, wherein the first tag is indicative of the first attribute shared by the first plurality of sensor data points;
    tagging, by the robot, each of the identified second plurality of sensor data points with a second tag, wherein the second tag is indicative of the second attribute shared by the second plurality of sensor data points, and wherein the second tag also indicates a lower priority than the first tag;
    identifying, by the robot, a context in which the robot is operating;
    identifying, by the robot, a first transport rule that governs how sensor data points tagged with the first tag are treated when the robot operates in the context;
    identifying, by the robot, a second transport rule that governs how sensor data points tagged with the second tag are treated when the robot operates in the context;
    offloading, by the robot to a remote computing device via a network connection, at least a subset of the first plurality of tagged sensor data points pursuant to the first transport rule, wherein the offloading comprises transmitting at least the subset of the first plurality of tagged sensor data points to the remote computing device in a manner selected based on the context in which the robot is operating; and
    overwriting, by the robot, at least a subset of the second plurality of tagged sensor data points pursuant to the second transport rule.

11. The method of claim 10, wherein the subset is selected from the first plurality of tagged sensor data points based on the context in which the robot is operating.

12. The method of claim 10, wherein the network connection is selected based on the context.

13. The method of claim 10, wherein the context comprises available communication bandwidth between the robot and the remote computing device.

14. The method of claim 10, wherein the context comprises reliability of the network connection.

15. The method of claim 10, wherein the context comprises power available to the robot.

16. The method of claim 10, wherein the context comprises available memory in the robot.

17. The method of claim 10, wherein the context comprises an activity level of the robot.

18. A method comprising:
- identifying, by a robot, first and second pluralities of sensor data points that are generated during operation of the robot while the robot performs one or more tasks, wherein the first plurality of sensor data points share a first attribute and the second plurality of sensor data points share a second attribute that is different than the first attribute, and wherein the sensor data points are generated by two or more of an accelerometer integral with the robot, a gyroscope integral with the robot, a force sensor integral with the robot, and a torque sensor integral with the robot;
- tagging, by the robot, each of the identified first plurality of sensor data points with a first tag, wherein the first tag is indicative of the first attribute shared by the first plurality of sensor data points;
- tagging, by the robot, each of the identified second plurality of sensor data points with a second tag, wherein the second tag is indicative of the second attribute shared by the second plurality of sensor data points, and wherein the second tag also indicates a lower priority than the first tag;
- identifying, by the robot, a context in which the robot is operating;
- identifying, by the robot, a first transport rule that governs how sensor data points tagged with the first tag are treated when the robot operates in the context;
- identifying, by the robot, a second transport rule that governs how sensor data points tagged with the second tag are treated when the robot operates in the context;
- offloading, by the robot to a remote computing device via a network connection, at least a subset of the first plurality of tagged sensor data points pursuant to the first transport rule, wherein the offloading comprises transmitting at least the subset of the first plurality of tagged sensor data points to the remote computing device in a manner selected based on the context in which the robot is operating; and
- overwriting, by the robot, at least a subset of the second plurality of tagged sensor data points pursuant to the second transport rule.

* * * * *